(12) United States Patent
Shokri et al.

(10) Patent No.: US 7,760,743 B2
(45) Date of Patent: Jul. 20, 2010

(54) EFFECTIVE HIGH AVAILABILITY CLUSTER MANAGEMENT AND EFFECTIVE STATE PROPAGATION FOR FAILURE RECOVERY IN HIGH AVAILABILITY CLUSTERS

(75) Inventors: Eltefaat Shokri, Newport Coast, CA (US); Nicholas A. Solter, Tustin, CA (US); Frederic Barrat, Alameda, CA (US); Sacha C. Arnoud, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 1000 days.

(21) Appl. No.: 11/369,312

(22) Filed: Mar. 6, 2006
(Under 37 CFR 1.47)

(65) Prior Publication Data
US 2007/0206611 A1    Sep. 6, 2007

(51) Int. Cl.
*H04L 12/56* (2006.01)
*G01R 31/38* (2006.01)

(52) U.S. Cl. .................. 370/400; 370/412; 709/208; 714/25

(58) Field of Classification Search .............. 370/401, 370/254, 400, 210, 276, 282, 328, 338, 352, 370/356, 389, 392, 402, 406, 412–417, 442, 370/463, 465, 490, 502, 509, 535, 230, 230.1, 370/235, 429, 216–228, 231; 709/203, 238, 709/220–227, 208–211, 231, 245, 248, 249, 709/260; 714/1–13, 25, 43, 726
See application file for complete search history.

(56) References Cited

U.S. PATENT DOCUMENTS

| | | | |
|---|---|---|---|
| 5,630,047 A * | 5/1997 | Wang | 714/15 |
| 6,401,120 B1* | 6/2002 | Gamache et al. | 709/226 |
| 6,983,317 B1* | 1/2006 | Bishop et al. | 709/223 |
| 7,020,076 B1* | 3/2006 | Alkalai et al. | 370/217 |
| 7,043,663 B1* | 5/2006 | Pittelkow et al. | 714/4 |
| 2002/0174379 A1* | 11/2002 | Korenevsky et al. | 714/19 |
| 2004/0105436 A1* | 6/2004 | Ament | 370/362 |
| 2005/0050544 A1* | 3/2005 | Saito et al. | 718/103 |
| 2005/0216510 A1* | 9/2005 | Kautzleben et al. | 707/104.1 |
| 2006/0036756 A1* | 2/2006 | Driemeyer et al. | 709/231 |
| 2006/0200533 A1* | 9/2006 | Holenstein et al. | 709/208 |

FOREIGN PATENT DOCUMENTS

WO    WO 2004/097643    *  4/2004

* cited by examiner

*Primary Examiner*—Aung S Moe
*Assistant Examiner*—Prince Mensah
(74) *Attorney, Agent, or Firm*—Osha • Liang LLP

(57) ABSTRACT

A node availability management system includes a president node which includes a message queue to store a message, a decision engine configured to generate an operation based on the message, where said operation includes a plurality of atomic actions arranged in a dependency graph, an executor configured to execute the operation by executing the plurality of atomic instructions in the dependency graph, and a slave node operatively connected to the president node, where the executor offloads the execution of at least one of the plurality of atomic actions to the slave node.

10 Claims, 6 Drawing Sheets

EFFECTIVE HIGH AVAILABILITY CLUSTER MANAGEMENT AND EFFECTIVE STATE PROPAGATION FOR FAILURE RECOVERY IN HIGH AVAILABILITY CLUSTERS

BACKGROUND

High Availability (HA) Clusters are a class of distributed systems that provide high availability for applications. The high availability is achieved using hardware redundancy to recover from single points of failure. HA clusters generally include two or more computer systems called "nodes." For this reason, HA Clusters are generally referred to as Node Availability Management Systems. Node Availability Management Systems manage both nodes and applications running on the nodes. Each node runs a local operating system kernel. The cluster software, which may be considered an extension of the operating system, starts applications on one or more nodes of the cluster and monitors various aspects of the software and hardware stack. The component of the software that handles application availability is generally referred to as an Availability Manager (AM).

In the event of hardware or software failure, the AM automatically restarts applications on the same node or "fails over" the applications to other nodes in order to keep the applications available. In addition, the AM is able to bring applications online or offline in response to administrative requests. The AM can be thought of as reacting to events. These events can generally include administrative commands and error notifications from other parts of the system (e.g., application death, node death, application non-responsiveness, etc.). HA Clusters typically have a single node, referred to as the president node, that makes all the decisions regarding actions to execute following an event. The president node dictates orders to the remaining nodes, referred to as worker or slave nodes, in order to carry out the execution of the actions.

Numerous execution models are available for carrying out decisions made by the president node. A common model is a standard procedural approach, where each decision is processed by a separate code path in the president node. When the president node wants to dictate orders to the slave nodes, it makes decision-specific inter-node communication calls to the worker nodes to process the event.

Any HA Cluster that uses a president node must consider the possible failure or death of the president node. A common approach to this possibility involves "checkpointing" or "state propagation". Using this approach, state information is saved to other nodes or to persistent storage so a new president may take over operations following a president node death or malfunction.

SUMMARY

In general, in one aspect, the invention relates to a node availability management system including a president node including a message queue to store a message, a decision engine configured to generate an operation based on said message, where said operation includes a plurality of atomic actions arranged in a dependency graph, an executor configured to execute said operation by executing the plurality of atomic instructions in the dependency graph, and a slave node operatively connected to the president node, where the executor offloads the execution of at least one of the plurality of atomic actions to the slave node.

In general, in one aspect, the invention relates to a distributed computing system for responding to an event including a president node configured to convert the event to a message, and a slave node operatively connected to the president node, where the president node generates an operation comprising a dependency graph of atomic instructions based on the message, wherein the president node comprises an executor for executing the plurality of atomic instructions of the operation, and where the executor offloads the execution of at least one of the plurality of atomic actions to the slave node.

In general, in one aspect, the invention relates to a method of checkpointing a message in a node availability management system including determining a checkpoint domain for the message, obtaining a dependency graph associated with an operation, where the operation is associated with the message, sending a checkpoint message to all nodes in the checkpoint domain, where the checkpoint message comprises the dependency graph, executing one of a plurality of atomic actions within the dependency graph, and sending a first updated checkpoint message with updated dependency graph to all nodes in the checkpoint domain.

In general, in one aspect, the invention related to a computer readable medium containing instructions for checkpointing a message in a node availability management system, the instructions including functionality to determine a checkpoint domain for the message, obtain a dependency graph associated with the operation, where the operation is associated with the message, send a checkpoint message to all nodes in the checkpoint domain, where the checkpoint message includes the dependency graph, execute one of a plurality of atomic actions within the dependency graph, and send a first updated checkpoint message with updated dependency graph to all nodes in the checkpoint domain.

Other aspects of the invention will be apparent from the following description and the appended claims.

DETAILED DESCRIPTION

Figure 1:
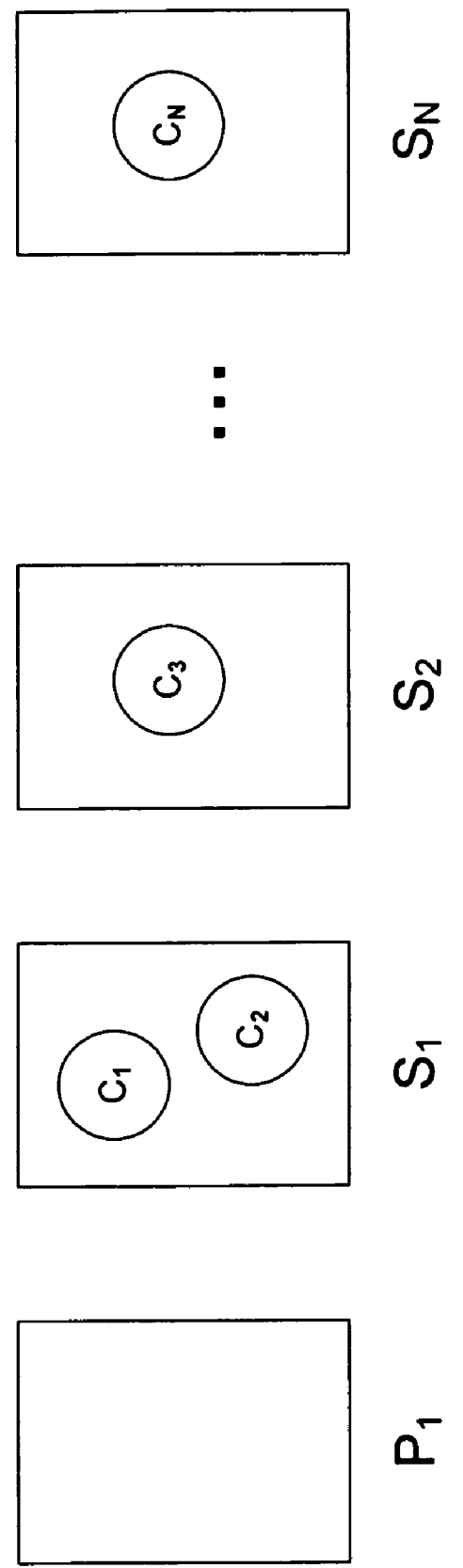
FIG. 1 shows a diagram of a node availability management system in accordance with one or more embodiments of the present invention.

Exemplary embodiments of the invention will be described with reference to the accompanying drawings. Like items in the drawings are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

One or more embodiments of the invention relate to a method and apparatus for operating a node availability management system. More specifically, one or more embodiments of the invention relate to a node availability management system with a president node including a decision engine and an executor.

FIG. 1 shows a diagram of a node availability management system in accordance with one or more embodiments of the present invention. The node availability management system shown in FIG. 1 implements a president/slave model. The node availability management system includes a president node ($P_1$) and several slave nodes ($S_1, S_2, \ldots, S_N$). The president node ($P_1$) is responsible for making decisions and maintaining centralized information about ongoing operations and application availability (also referred to as component availability). The president node ($P_1$) relies on the slave nodes ($S_1, S_2, \ldots, S_N$) to carryout instructions and to communicate (e.g., directly or indirectly via special callback scripts) with the components ($C_1, C_2, \ldots, C_N$). In one embodiment of the invention, the president node ($P_1$) may also act like a slave node and execute instructions against local components. Various types of components ($C_1, C_2, \ldots, C_N$) may run on one or more nodes. The types of components ($C_1, C_2, \ldots, C_N$) running on each node may be different depending on the node's load and other factors well known in the art. Further, different nodes may run different components ($C_1, C_2, \ldots, C_N$) and the distribution of components ($C_1, C_2, \ldots, C_N$) among nodes may change overtime. In general, each node represents a different computer system. These computer systems work together to form the node availability management system.

Figure 2:
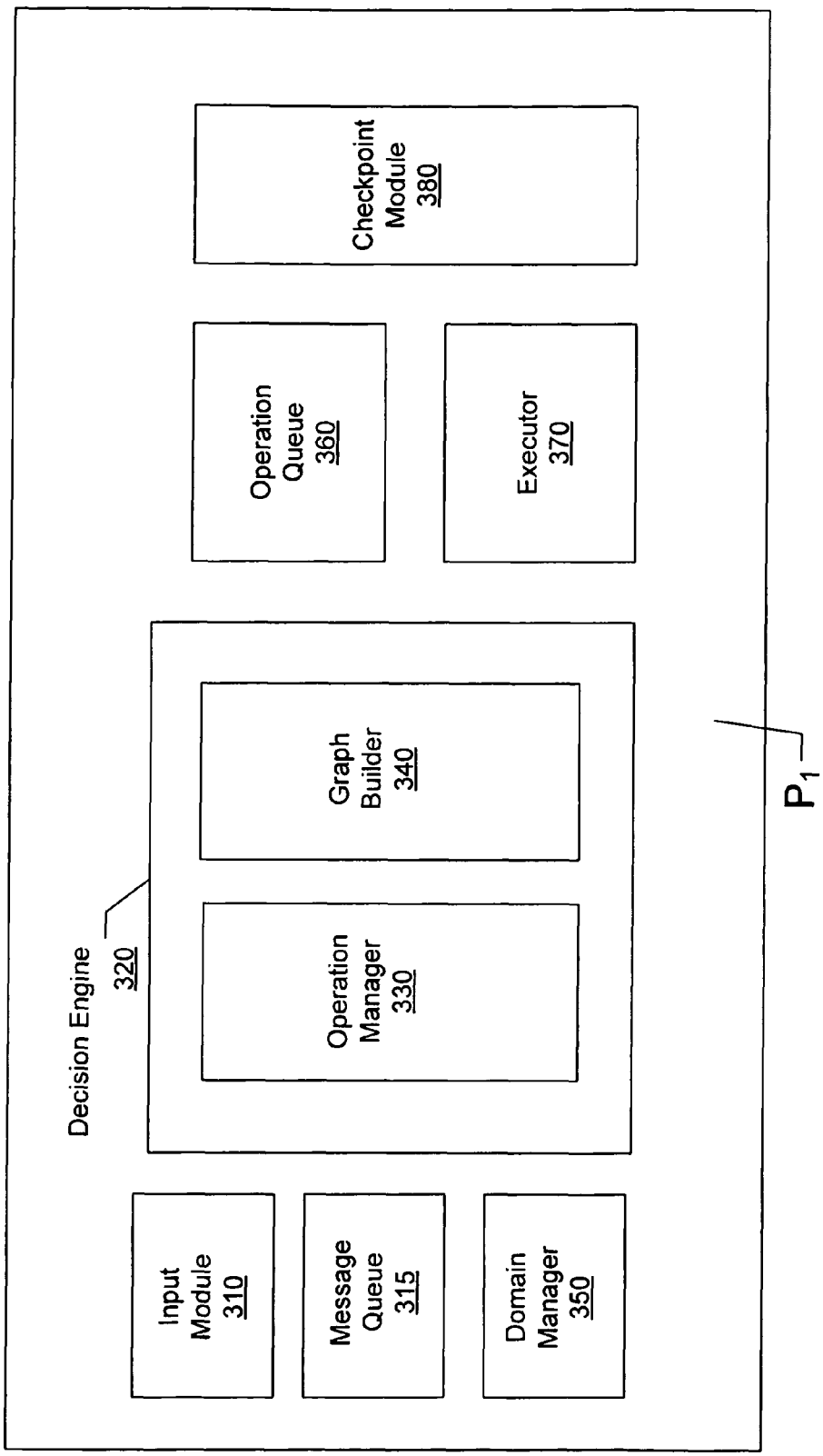
FIG. 2 shows a structure of a president node in accordance with one or more embodiments of the present invention.

FIG. 2 shows the structure of the president node ($P_1$) in accordance with one or more embodiments of the present invention. The structure of the president node ($P_1$) includes an Input Module (310), a Message Queue (315), a Decision Engine (320), a Domain Manager (350), an Operations Queue (360), an Executor (370), and a Checkpoint Module (380). The Decision Engine (320) further includes an Operation Manager (330) and a Graph Builder (340). Each of the aforementioned components is discussed below.

The Input Module (310) is where all events (discussed below) are received by the president node ($P_1$). The Input Module (310) is capable of handling multiple incoming events simultaneously. The Input Module (310) outputs a corresponding message for each event.

The Message Queue (315) accepts messages for temporary storage. The Message Queue (315) may also sort messages such that the highest priority messages are placed at the front of the queue.

The Decision Engine (320) accepts a message, maps each message to an operation, and assigns a unique cluster-wide operation ID to the message/operation. In one or more embodiments of the invention, an operation is a response to a message. More specifically, each operation is a set of atomic actions that must be executed in a specific order to respond to the message.

The Operation Queue (360) is a temporary storage location for operations. In one or more embodiment of the invention, the operations in the Operation Queue (360) may be stored in any order.

The Executor (370) accepts operations and executes all the atomic actions corresponding to the operation in the required order. In one embodiment of the invention, the Executor (370) is capable of executing multiple operations in parallel.

The Domain Manager (350) accepts the operation, and is responsible for preventing two different operations from interfering with each other while their respective atomic actions are being executed. An operation domain is the set of nodes and components which may be affected by the operation or used by the operation. The Domain Manager (350) is responsible for establishing operation domains and for preventing execution conflicts within the operation domains.

The Checkpoint Module (380) is used to checkpoint (i.e., store) messages and operations such that if the president node dies, the new president node may establish which operations were being executed, or were queued for execution, and may restart execution. As discussed above, in one or more embodiments of the invention, the operation domain of an operation is the set of nodes and components which may be affected by the operation or used by the operation. The nodes belonging to the operation domain constitute a checkpoint domain. In other words, the checkpoint domain of an operation is very similar to the operation domain of the operation, except that the checkpoint domain only contains the nodes of the operation domain. In one embodiment of the invention, the node availability management system checkpoints messages and dependency graphs (discussed below) for a given operation only to nodes that are part of the corresponding checkpoint domain.

As discussed above, the Decision Engine (320) maps a message to an operation. The Decision Engine (320) further includes an Operation Manager (330) and a Graph Builder (340). In one embodiment of the invention, the Operation Manager (330) is responsible for determining which operation needs to be executed in response to the message. In one embodiment of the invention, the Graph Builder (340) is responsible for determining which atomic actions correspond to the selected operation, and in which order the atomic actions need to be executed to successfully execute the operation. Successfully executing all the atomic actions associated with the operation in the correct order corresponds to successfully executing the operation.

Figure 3:
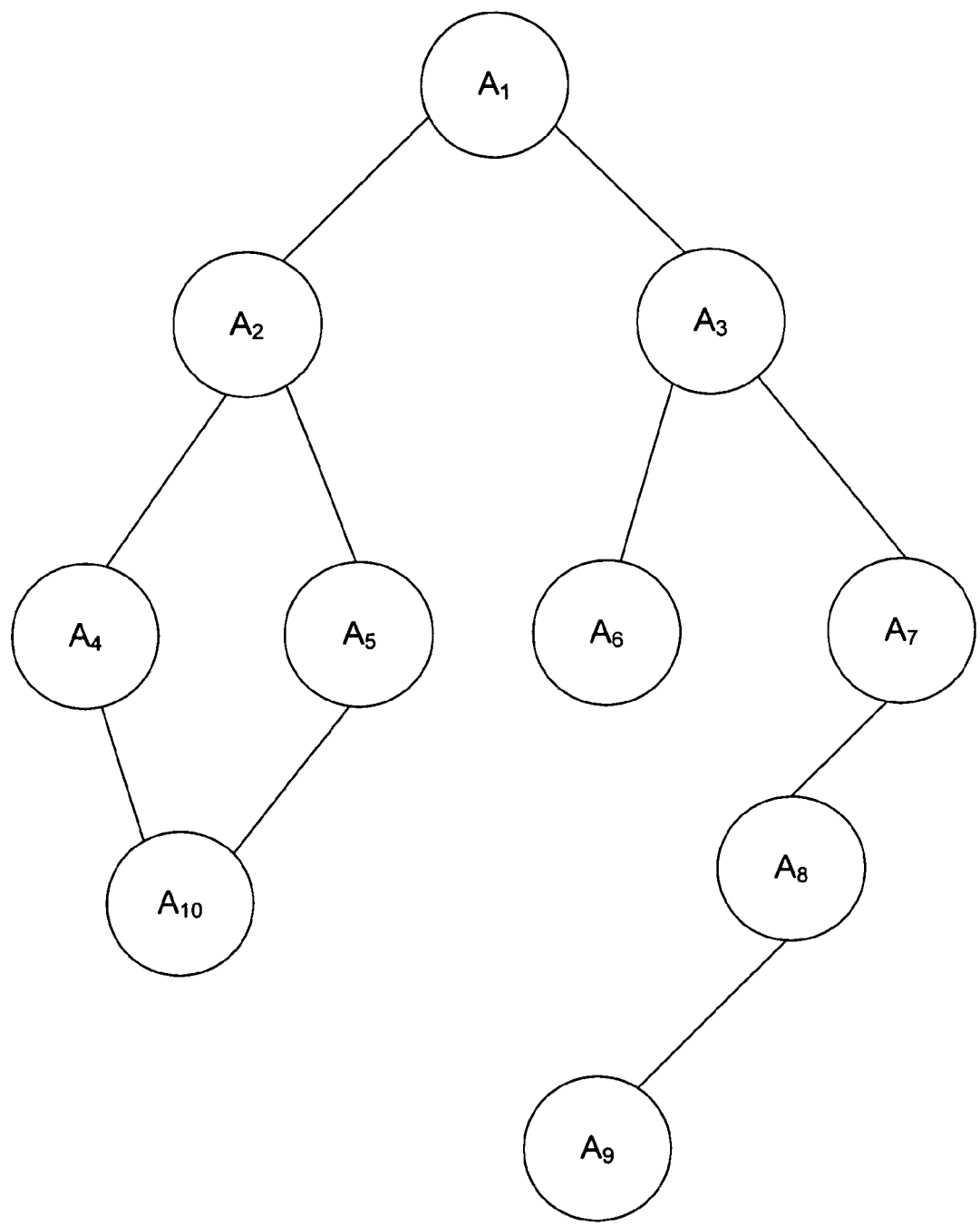
FIG. 3 shows a dependency graph of atomic actions in accordance with one or more embodiments of the present invention.

As discussed above, each operation decomposes into a set of inter-related atomic actions which need to be executed in a certain order. A set of inter-related atomic actions arranged in a specific order to execute an operation may be represented by a dependency graph. FIG. 3 is an example of a dependency graph in accordance with one embodiment of the present invention. The dependency graph (300) is composed of several atomic actions ($A_1, \ldots, A_{10}$). The dependency graph (300) dictates the order of execution for the atomic actions ($A_1, \ldots, A_{10}$). For example, still referring to FIG. 3, atomic action $A_1$ must be executed first. Following the execution of $A_1$, the branches starting with $A_2$ and $A_3$ can be executed either sequentially or in parallel. In regard to the branch starting with $A_2$, following the execution of $A_2, A_4$, and $A_5$ can be executed either sequentially or in parallel. However, both $A_4$ and $A_5$ must execute successfully before $A_{10}$ can be executed. In regard to the branch starting with $A_3$, following the execution of $A_3, A_6$, and $A_7$ can be executed either sequentially or in parallel. However, $A_8$ must be executed after $A_7$, and $A_9$ must be executed after $A_8$.

The Graph Builder (340) includes functionality to build dependency graphs for each operation. A Dependency Graph object represents a dependency graph of Atomic Action objects, ready to be executed. A Dependency Graph Object exists for each operation. When an operation of a certain type is created, its dependency graph will be created as well.

In one or more embodiment of the present invention, the operation, dependency graph, and atomic actions may be implemented using object-oriented principles. For example, the operations are defined as a class hierarchy, with an abstract Operation superclass. Further, all operations may be subclasses of the Operation superclass. Similarly, the atomic actions may be defined in a class hierarchy, with an abstract Atomic Action superclass. All atomic actions may be subclasses of the Atomic Action superclass. Such embodiments may be considered object-oriented virtual machine models of the present invention. In such models, each atomic action may be thought of as a single instruction in a virtual machine. The virtual machine concept is well known in the art.

In one embodiment of the present invention, the node availability management system reacts to events. Events include, for example, component registration, recovery initiation, repair initiation, and administrative requests. The administrative requests, for example, allow the administrator to change the component distribution among nodes. Such requests further include, for example, moving a component from one node to another, or evacuating a node from its application or shutting a node down.

Figure 4:
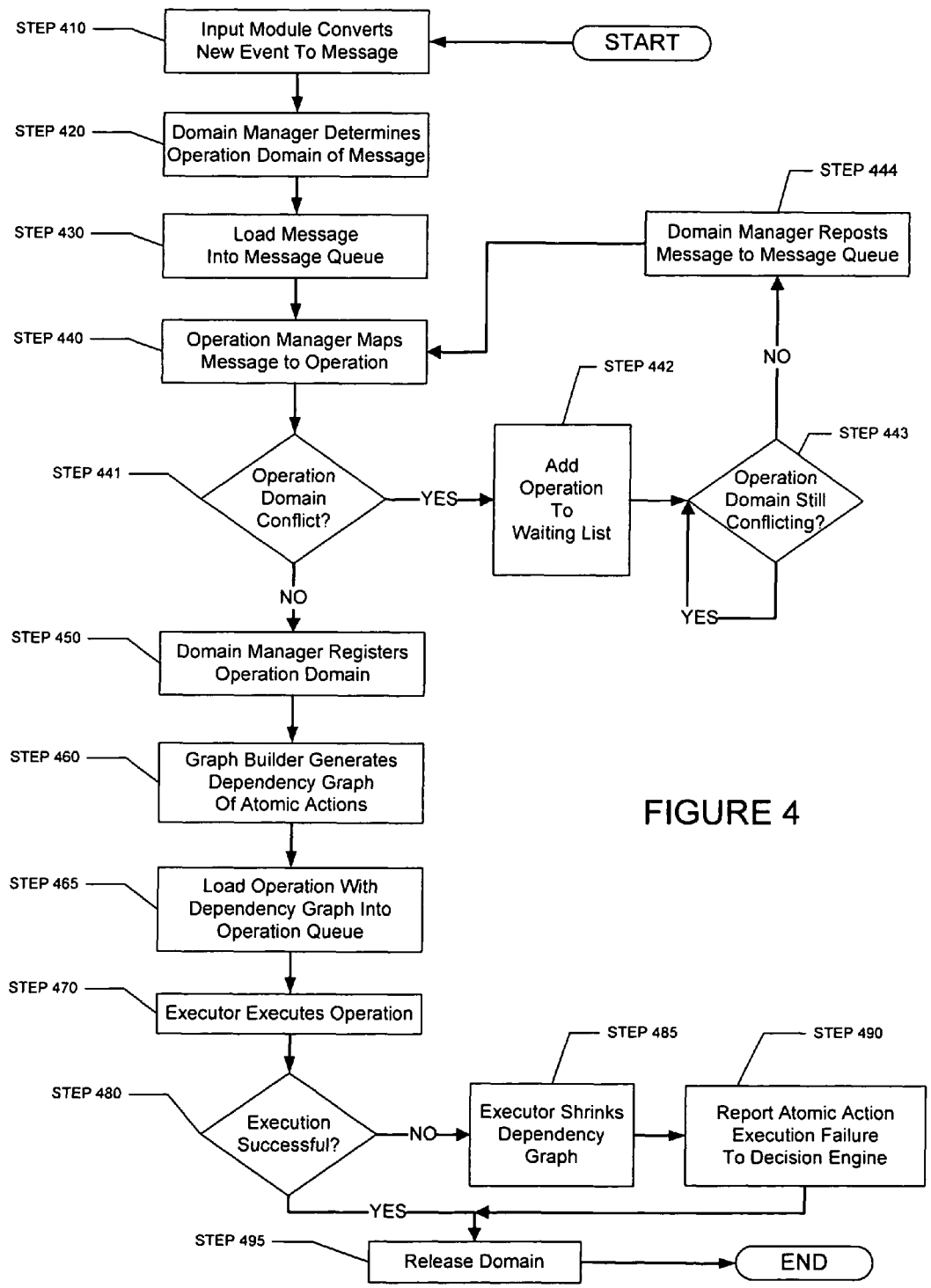
FIG. 4 shows a flowchart illustrating the response of the node availability management system to an incoming event in accordance with one or more embodiments of the present invention.

FIG. 4 is a flowchart illustrating the reaction of the node availability management system to an event in accordance with one embodiment of the invention. Initially, a new event arrives at the Input Module (310) of the president node ($P_1$). The newly arrived event is converted into a message describing the event in STEP 410. In one embodiment of the invention, the Input Module (310) is capable of processing multiple events in parallel. In STEP 420, the Input Module (310) uses the Domain Manager (350) to determine an operation domain of the message. In STEP 430, the message is loaded into the Message Queue (315). In one embodiment of the invention, the Message Queue (315) sorts the messages such that the highest priority messages are places in the front of the queue.

Next, the Operation Manager (330) of the Decision Engine (320) pulls the message from the Message Queue (315) and maps the message to an operation(s) in STEP 440. In STEP 441, the Domain Manager (350) determines whether the operation domain (determined in STEP 420) of the operation (s) conflicts with the operation domains of any currently executing operations. If no conflict exists, in STEP 450, the Operation Manager (330) uses the Domain Manager (350) to reserve (i.e., lock) the operation domain determined earlier (i.e., in STEP 420).

In one embodiment of the invention, if a conflict exists, the Domain Manager (350) may store the operation in a waiting list (STEP 442). In one embodiment of the invention, the waiting list is associated with one of the operation domains found to be conflicting with the operation domain of the operation. When the operation domain no longer conflicts (STEP 443), the Domain Manager (350) may repost the message to the Message Queue (315) (STEP 444) so the Operation Manager (330) may restart or begin the processing.

Still referring to FIG. 4, in STEP 460, the Graph Builder (340) is used to generate the dependency graph for the operation. The Graph Builder (340) accepts the operation from the Operation Manager (330) and generates the corresponding dependency graph of atomic actions (i.e., tasks to execute to successfully execute the operation). In STEP 465, the operation with its dependency graph is loaded into the Operations Queue (360). In STEP 470, the Executor (370) executes the operation by executing all the atomic actions in the dependency graph corresponding to the operation. The Executor (370) may use whatever scheduling policy is most appropriate to execute operations. In one embodiment, the scheduling policy is round robin, where the Executor (370) cycles through the dependency graphs of different operations, executing one atomic action on each dependency graph, or a branch of atomic actions on each dependency graph. In one embodiment of the invention, a priority based scheduling policy is implemented, where higher priority dependency graphs, or higher priority branches of dependency graphs, are executed before lower-priority dependency graphs or lower-priority branches of dependency graphs. In one embodiment of the invention, each dependency graph is executed in a breadth-first order. When executing an atomic action on the dependency graph, the Executor (370) calls the function associated with the atomic action, passing the arguments found in the atomic action. Once the function is completed, the atomic action is marked as executed, and the child atomic actions are ready to be executed.

In one embodiment of the present invention, the Executor (370) keeps a list of atomic actions ready for execution for every dependency graph. At first the top or root atomic action is placed in the list. Once the atomic action is executed, it is removed from the list and all its dependent atomic actions are added to the list. When the list is empty, the execution of the dependency graph is complete and thus, the execution of the operation is successful.

The execution of a branch of a dependency graph may be suspended when an atomic action sends a request to a slave node. The next atomic action in the branch may process the reply from the slave node, but it cannot be executed until the slave node replies or until a predefined timeout occurs. In one embodiment of the invention, the Executor (370) maintains a second list for each dependency graph being executed which tracks the suspended atomic actions. When the Operation Manager (330) receives a reply from the slave node, it passes the message directly to the Executor (370), bypassing the Graph Builder (340). The Executor (370) can then move the atomic action from the list of suspended atomic actions to the list of atomic actions ready for execution.

Still referring to FIG. 4, in STEP 480, the Executor (370) determines whether the execution of the operation was successful. As discussed above, successful execution of an operation requires successful execution of all the atomic actions associated with the operation in the correct order. If an atomic action fails to execute, the Executor (370) shrinks (i.e., severs) the branch with the failed atomic action, and the dependent atomic actions of the failed atomic action are not executed (STEP 485). When an atomic action fails to execute, the Executor (370) may also generate an error report message and place the message in the Message Queue (315) to be processed by the Decision Engine (320) (STEP 490). In one embodiment of the invention, the branches not dependent on the failed atomic action continue to be executed and the Executor (370) may shrink the dependency graph again should another atomic action fail to execute. In one embodiment of the invention, the branch with the failed atomic action may be replaced with a new branch.

In one embodiment of the present invention, the Operation Manager (330) can post an abort operation in the Operation Queue (360) to inform the Executor (370) that a node or component died and communication with the node or component should be avoided. The Executor (370) marks the node or component as dead and checks the list of suspended atomic actions for atomic actions awaiting a response from the now dead component or node. Those atomic actions are removed from the suspended list and treated as failed atomic actions. Any future atomic action that needs to make a callback to a dead component or node is returned prematurely without making the callback.

If the execution of the operation is successful, the operation domain is no longer required to be reserved. The Executor (370) may use the Domain Manager (350) to release the operation domain (STEP 495). In one embodiment of the invention, the operation domain may be released in several steps, freeing fractions of the operation domain that are no longer required to successfully execute the operation. As the Executor (370) traverses the dependency graph for the operation, it will inform the Domain Manager (350) as to which segments of the operation domain may be released.

The Checkpoint Module (380) is used to checkpoint (i.e., store on specific slave nodes) messages and dependency graphs such that if the president node dies, or a new president node is elected, the new president node may establish what operations were being executed and may restart their execution quickly. As discussed above, an operation domain is the set of nodes and components which may be affected by an operation or used by an operation. The checkpoint domain of an operation includes the nodes belonging to the operation domain of the operation. In other words, the checkpoint domain of an operation includes all the nodes which may be affected by the corresponding operation or used by the corresponding operation. The node availability management system checkpoints messages and dependency graphs belonging to a given operation only to nodes that are part of the operation's checkpoint domain.

Figure 5:
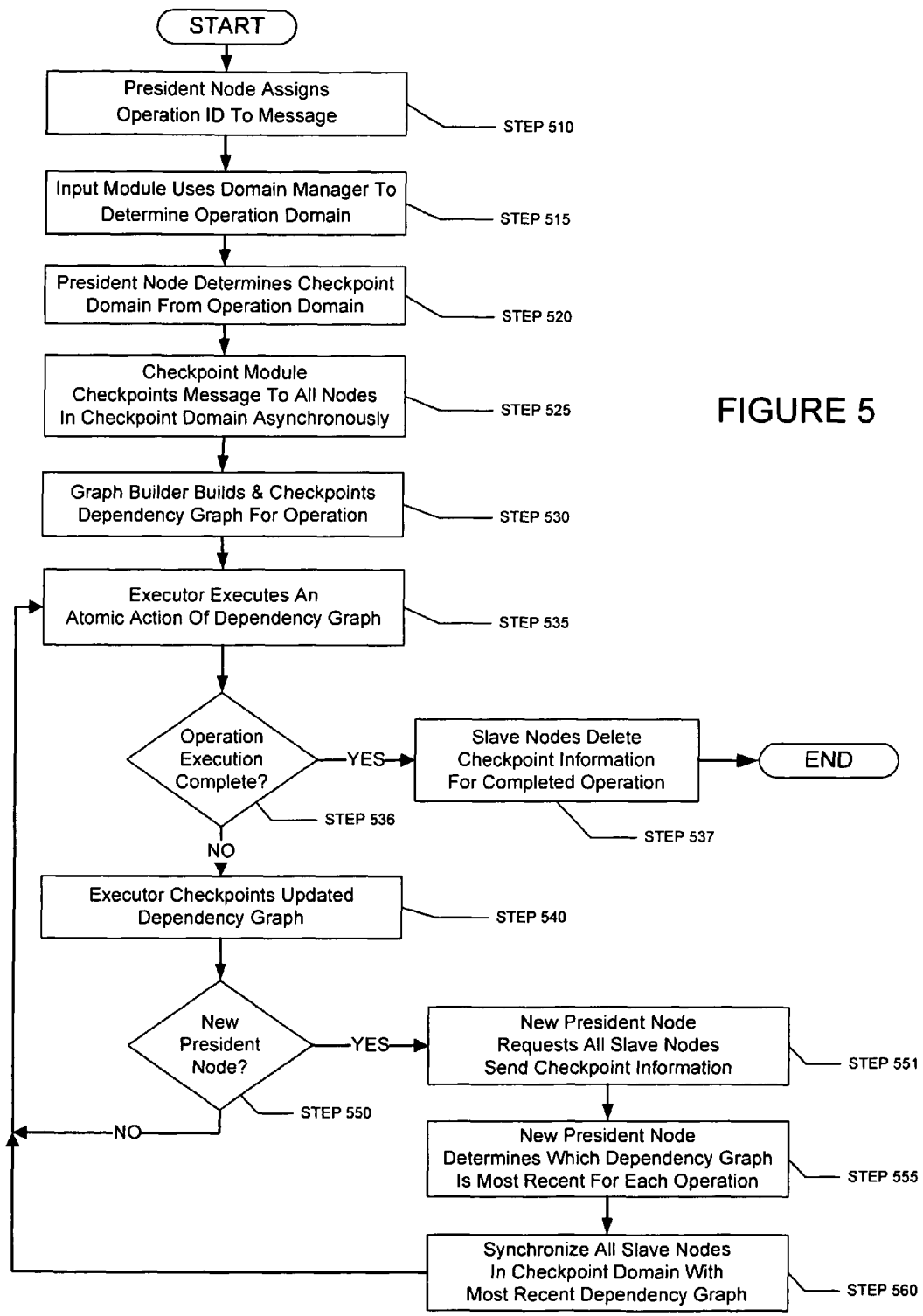
FIG. 5 shows a flowchart illustrating the checkpointing process for the node availability management system in accordance with one or more embodiments of the present invention

FIG. 5 is a flowchart illustrating the checkpointing process for the node availability management system in accordance with one or more embodiments of the invention. Messages are checkpointed when they are added to the Message Queue (315). When a message arrives, the president node assigns a single operation ID to both the message and corresponding operation (STEP 510). As discussed above, the Domain Manager (350) is used to determine the operation domain for the message (STEP 515). From the operation domain, the president node can determine the list of nodes forming the checkpoint domain for the message (STEP 520). The message is then added to the Message Queue (315), and checkpointed asynchronously to all the nodes in the checkpoint domain using the Checkpoint Module (380) (STEP 525).

The slave nodes respond to each checkpoint request from the president node by storing the requested information (e.g., the message to be checkpointed or the dependency graph to be checkpointed). There is separate checkpoint storage for each operation based on the operation ID. Each checkpoint request from the president node replaces or updates the previous information for the given operation.

Once the dependency graph is generated for an operation, the Graph Builder (340) checkpoints the operation under the same operation ID as the initial message (STEP 530). The dependency graph replaces the message in the checkpoint storage for that operation ID. Each time an atomic action of the dependency graph is executed (STEP 535), the dependency graph is updated and the update is propagated asynchronously to all checkpoints in the checkpoint domain (STEP 540). Slave nodes store the checkpointed dependency graphs in memory and replace the checkpointed dependency graphs with updated versions sent by the president node. Once a dependency graph has completely executed (STEP 536), or all remaining branches following a graph shrinking have been executed, the operation is finished and can be removed from all checkpoints in the checkpoint domain (STEP 537).

For each operation, the slave nodes keep track of the number of received updates. In one embodiment of the present invention, the initial message corresponding to an operation is checkpointed with an update number of 0, the initial dependency graph has an update number of 1, and any received updated version of the dependency graph increments the update number by 1. At any given time, the slave node with the highest update number for an operation has the latest version of the dependency graph for that operation.

When a node dies, or a node malfunctions, or a node joins the node availability management system, the cluster reconfigures. If the reconfiguration results in a new president node, each slave node sends all its state information and the full contents of its checkpoint storage to the new president node (STEP 551). In one or more embodiments of the invention, in the case of every operation the new president node discovers, the new president node compares the update number from all the slave nodes in the checkpoint domain of the operation to determine the most recent version of the dependency graph for the given operation (STEP 555). The president node needs to resynchronize slave nodes in the checkpoint domain so all slave nodes have the most recent version of the dependency graph for the operation (STEP 560). The new president node also adds to the Message Queue (315) the messages for those operations that were not processed by the Decision Engine (320) of the old president node.

Those skilled in the art will appreciate that the order and number of steps shown in FIG. 5 may differ among embodiments of the invention. For example, in accordance with one embodiment of the invention, the process may directly return to STEP 535 following completion of STEP 540. In such an embodiment, determining if a new president node exists (STEP 550) may be established independently of STEPS 510, 515, 520, 525, 530, 535, 536, 537, 540, and/or may be established periodically or following a timeout. When it is determined that a new president node exists, the embodiment may carryout STEPS 551, 550, and 560.

In one or more embodiments of the invention, by reserving the operation domain, the execution of conflicting operations is avoided. This still allows for maximum parallelism in both the execution of un-related atomic actions of an operation and the execution of various operations. In one or more embodiments of the invention, by using a checkpoint domain, the state of an operation is propagated only to the affected nodes allowing for scalability. In one or more embodiments of the invention, by making the recovery operation a set of well-defined actions, the implementation of the recovery process is simplified. In one or more embodiments of the invention, the system allows an observer to trace (e.g., study, observe, record) the progress of each operation by examining which atomic actions have been executed. In one or more embodiments of the invention, the system allows for the easy addition of new operations.

Figure 6:
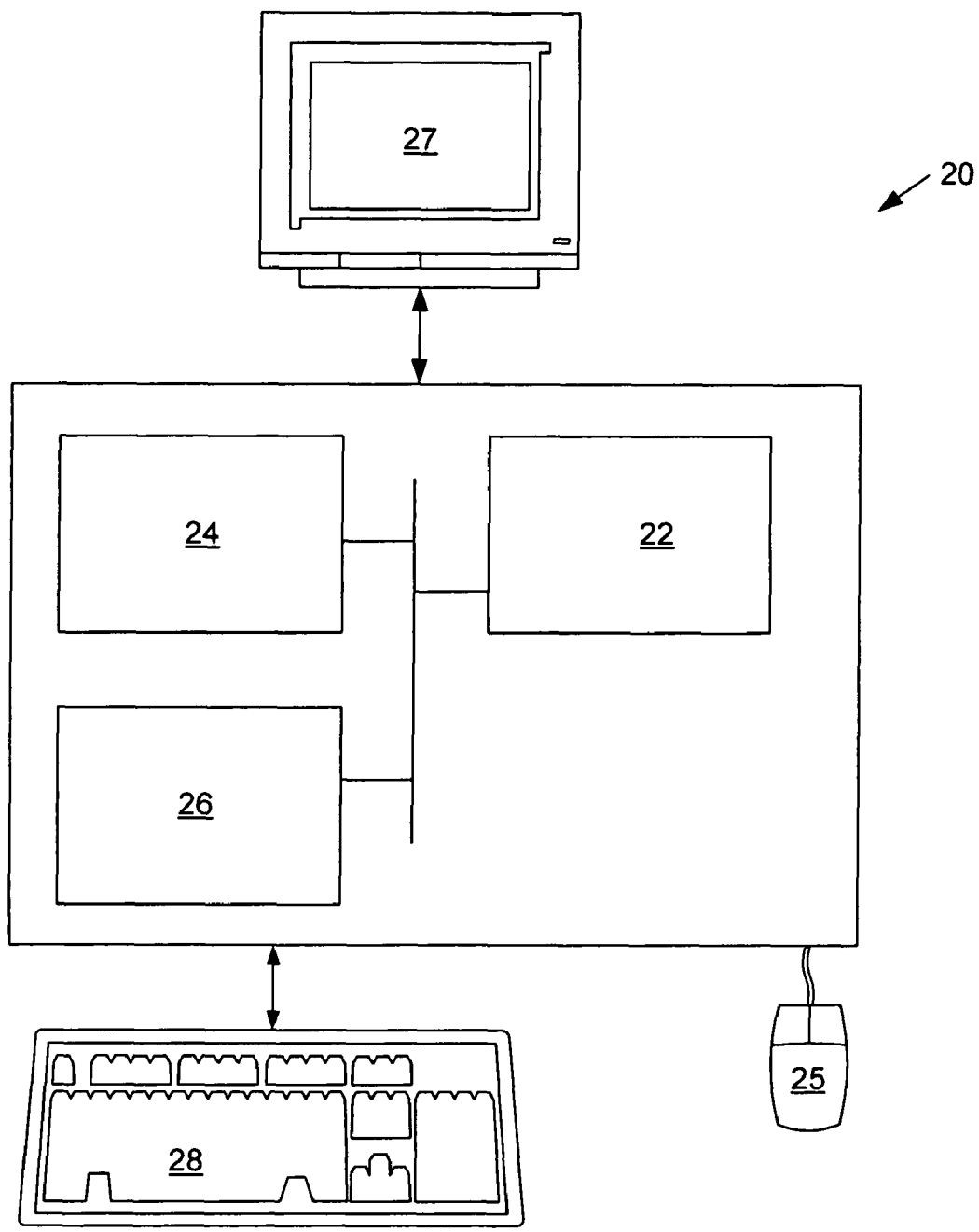
FIG. 6 shows a computer system in accordance with one or more embodiments of the present invention.

In one or more embodiments, the invention may be implemented on virtually any type of computer regardless of the platform being used. For example, as shown in FIG. 6, a computer system (20) includes a processor (22), associated memory (24), a storage device (26), and numerous other elements and functionalities typical of today's computers (not shown). The computer (20) may also include input means, such as a keyboard (28) and a mouse (25), and output means, such as a monitor (27) or printer (not shown). The computer system (20) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (20) may be located at a remote location and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, one skilled in the art, having benefit of this disclosure, can appreciate that other embodiments can be devised which do not depart from the scope of the invention as disclosed herein. Accordingly, the scope of the invention should be limited only by the attached claims.

The invention claimed is:

1. A node availability management system comprising:
    a president node comprising:
        a message queue to store a message;
        a decision engine comprising:
            an operation manager configured to generate an operation based on said message, and wherein said operation includes a plurality of atomic actions arranged in a dependency graph to respond to the message,
            a graph builder configured to build the dependency graph for the operation using the plurality of atomic actions,
            a domain manager configured to:
                determine an operation domain comprising at least one of a plurality of nodes affected by the operation and at least one of a plurality of components affected by the operation,
                compare the operation domain of the operation to a second operation domain of a concurrently executing second operation,
                determine whether the operation domain of the operation conflicts with the second operation domain of the concurrently executing second operation, wherein the domain manager locks the operation domain when no conflict exists, and
                release the operation domain when the operation is completed;
            an executor configured to execute said operation by executing the plurality of atomic actions in the dependency graph in breadth-first order,
                wherein a parent atomic action of the plurality of atomic actions is completely executed before a child atomic action of the plurality of atomic actions is executed,
                wherein the executor maintains a queue of parent atomic actions, and wherein the executor is further configured to:
                    add the parent atomic action to the queue,
                    execute the parent atomic action,
                    remove the parent atomic action from the queue,
                    add the dependent child atomic actions to the queue, and
                    tag the operation as complete when the queue is empty; and
    a slave node operatively connected to the president node,
        wherein the executor offloads the execution of at least one of the plurality of atomic actions to the slave node, and
        wherein executing the plurality of atomic actions is suspended until one of a group consisting of the slave node replying to the atomic action and a timeout occurs.

2. The system of claim 1, wherein the president node is configured to act as the slave node.

3. The system of claim 1, wherein the president node further comprises:
    a domain manager further configured to maintain a waiting list that stores the operation when the conflict exists, wherein the operation is stored until the conflict is resolved.

4. The system of claim 1, wherein the president node further comprises:
    a checkpoint module configured to checkpoint the dependency graph associated with the operation to a checkpoint domain, wherein the checkpoint domain comprises the at least one of a plurality of nodes in the operation domain, and wherein each time at least one of the plurality of atomic actions in the dependency graph is executed, the dependency graph is checkpointed asynchronously to the nodes in the checkpoint domain.

5. The system of claim 1, wherein the executor is configured to execute multiple operations in parallel.

6. A distributed computing system for responding to an event comprising:
    a president node configured to convert the event to a message; and
    a slave node operatively connected to the president node,
    wherein the president node generates an operation in response to the message comprising a dependency graph of atomic actions;
    wherein the president node assigns a priority to the dependency graph wherein a higher-priority dependency graph is executed prior to a lower-priority dependency graph;
    wherein the president node comprises an executor for executing the plurality of atomic actions of said operation in breadth-first order, wherein the executor maintains a queue of parent atomic actions, and wherein the executor is further configured to:
        add the parent atomic action to the queue,
        execute the parent atomic action,
        remove the parent atomic action from the queue,
        add the dependent child actions to the queue, and
        tag the operation as complete when the queue is empty;
    wherein the president node is configured to:
        determine an operation domain comprising at least one of a plurality of nodes affected by the operation and at least one of a plurality of components affected by the operation,
        compare the operation domain of the operation to a second operation domain of a concurrently executing second operation,
        determine whether the operation domain of the operation the conflicts with the second operation domain of the concurrently executing second operation, wherein the domain manager locks the operation domain when no conflict exists, and
        release the operation domain when the operation is completed; and
    wherein the executor offloads the execution of at least one of the plurality of atomic actions to the slave node, and wherein executing the atomic actions is suspended until one of a group consisting of the slave node replying to the atomic action and a timeout occurs.

7. The system of claim 6, wherein the president node is configured to act as the slave node.

8. The system of claim 6, wherein the executor is configured to execute multiple operations in parallel.

9. The system of claim 6, wherein the executor is configured to shrink the dependency graph if execution of at least one of the plurality of atomic actions fails.

10. The system of claim 6, wherein the executor is configured to report the execution failure of the at least one of the plurality of atomic actions to a decision engine.

* * * * *